UNITED STATES PATENT OFFICE.

GEORGE ALFRED ABBOTT, OF BURNLEY, VICTORIA.

PROCESS OF MANUFACTURING FILTERING MATERIAL.

SPECIFICATION forming part of Letters Patent No. 651,474, dated June 12, 1900.

Application filed June 9, 1899. Serial No. 719,979. (No specimens.)

*To all whom it may concern:*

Be it known that I, GEORGE ALFRED ABBOTT, a subject of the Queen of Great Britain, and a resident of 53 Bendigo street, Burnley, in the Colony of Victoria, have invented a certain new and useful Filtering Material and Method or Process of Manufacturing Same, of which the following is a specification.

This invention has been devised to provide an efficient and economical filter medium or material and one which when dirtied by use may be easily cleaned either by washing or by heat; and it consists in the employment of a composition of materials and the method or process by which the component parts are associated together and afterward treated in order to produce the filtering material.

I shall now describe the materials used by me and the way in which they are treated.

I take clay (either red or white in color) and exercise special care that it is free of foreign matter, especially limestone. This clay is washed with clean water, so as to produce a pasty result, free from lumps of any kind. This clay paste is then dried until it hardens by exposure to the air or by evaporation in a heated appliance. The dry result is then ground in any approved grinding appliance to an impalpable powder resembling flour. I then take a quantity of selected non-bituminous lignite, and after drying same I grind it in any approved pulverizer into a powder which will pass through a gauze of about three hundred and fifty perforations to the square inch. It is absolutely necessary that the lignite must be non-bituminous and that it will not vitrify by heat. I then mix sixty-five parts, by bulk, of the finely-powdered clay with thirty-five parts, by bulk, of the sifted non-bituminous lignite, thoroughly associate these materials with one another in any approved mixing-machine, and add sufficient water thereto to form a stiff paste. It is preferable that the mixing action should be continued for some time after the water has been added to the parts before described and until it may be fairly assumed that the non-bituminous lignite has been equally disseminated throughout the clay. The stiff paste thus produced is then shaped on a potter's wheel into plates or blocks of the required shape and thickness to fit the filtering-machine in which my material is to be employed. The plate or block is then removed from the potter's wheel, partially dried, and placed under a press and a pressure of preferably about four and one-half tons per superficial square inch imposed upon it. The plate or block is then carefully, evenly, and slowly dried, conveyed to a potter's kiln, slowly heated therein, and the temperature raised until the plates are brought to a white heat. During the burning the fine particles of the non-bituminous lignite entirely disappear and leave small interstices in their place, in which an infinitesimal quantity of ash remains, with no vitrifying effect.

I have found by experiment that the use of other than non-bituminous lignite produces a vitreous remnant or coating which is impervious to the passage of water, and therefore practically useless as a filter material.

If the kiln has been allowed to cool down, the plates will be found to be of a uniform porosity and the minute interstices throughout the material will be such as to allow a passage of water through the material, but small enough to prevent any bacilli, microbe, foreign or solid matter to pass through.

I find by practice that when my filtering material (manufactured as herein mentioned) is used a quantity of organic and solid matters deposited by the water under filtration is left upon the outer side of the filter-plate and that such refuse may be freely removed by washing with either hot or cold water, or the filter-plate may be placed in any clean household fire and burned to a red heat, so as to completely destroy any remnant of such matters. It will thus be seen that the filtration properties of my material are indefinitely preserved. The non-bituminous non-vitrifying lignite may be obtained in the Colony of Victoria, Australia.

Having now particularly described and ascertained the nature of my said invention and in what manner the same is to be performed, I declare that what I claim is—

1. A filtering material compounded from a mixture of pulverized clay with pulverized non-bituminous non-vitrifying lignite incorporated together and burned substantially as and for the purposes set forth.

2. A filtering material compounded from a mixture of about sixty-five parts by bulk of clay with about thirty-five parts by bulk of non-vitrifying non-bituminous lignite associated and burned together substantially as and for the purposes set forth.

3. A method or process of manufacturing a filtering material compounded of non-vitrifying non-bituminous lignite with clay, consisting in pulverizing such materials, associating them together in their proportions with water to form a paste, subjecting the result therefrom to pressure, slowly drying the pasty material, and then placing it in a kiln and slowly raising the temperature to a white heat, substantially as and for the purposes set forth.

Signed at Melbourne, in the Colony of Victoria, this 8th day of May, 1899.

GEORGE ALFRED ABBOTT.

Witnesses:
A. O. SACHSE,
A. HARKER.